United States Patent
Harris

(10) Patent No.: US 8,885,208 B2
(45) Date of Patent: Nov. 11, 2014

(54) PROGRESSIVE REFINEMENT OF AN EDITED IMAGE USING SECONDARY HIGH RESOLUTION IMAGE PROCESSING

(75) Inventor: Jerry G. Harris, Newberry, FL (US)

(73) Assignee: Adobe Systems Incorporated, San Jose, CA (US)

( * ) Notice: Subject to any disclaimer, the term of this patent is extended or adjusted under 35 U.S.C. 154(b) by 2328 days.

(21) Appl. No.: 11/490,549

(22) Filed: Jul. 21, 2006

(65) Prior Publication Data

US 2013/0162678 A1    Jun. 27, 2013

(51) Int. Cl.
- *G06F 15/00* (2006.01)
- *G06F 3/14* (2006.01)
- *G09G 5/00* (2006.01)
- *G06K 9/40* (2006.01)

(52) U.S. Cl.
CPC .......... *G09G 5/00* (2013.01); *G09G 2340/0407* (2013.01); *G09G 2340/10* (2013.01); *G09G 2370/022* (2013.01); *G06F 3/14* (2013.01)
USPC ........... 358/1.2; 358/1.15; 382/298; 382/299; 382/270; 382/266; 382/269; 345/634; 345/506; 345/619; 345/698

(58) Field of Classification Search
None
See application file for complete search history.

(56) References Cited

U.S. PATENT DOCUMENTS

| | | | | |
|---|---|---|---|---|
| 4,658,247 A | * | 4/1987 | Gharachorloo | 345/560 |
| 4,888,812 A | * | 12/1989 | Dinan et al. | 382/140 |
| 5,119,081 A | * | 6/1992 | Ikehira | 345/698 |
| 5,428,722 A | * | 6/1995 | Marsh et al. | 345/619 |
| 5,790,708 A | * | 8/1998 | Delean | 382/270 |
| 5,861,920 A | * | 1/1999 | Mead et al. | 375/240.25 |
| 5,898,870 A | * | 4/1999 | Okuda et al. | 718/104 |
| 5,907,640 A | * | 5/1999 | Delean | 382/276 |
| 6,329,995 B1 | * | 12/2001 | Nagashima | 345/506 |
| 6,496,598 B1 | * | 12/2002 | Harman | 382/154 |
| 6,525,732 B1 | * | 2/2003 | Gadh et al. | 345/428 |
| 6,750,980 B1 | * | 6/2004 | Shimura et al. | 358/1.15 |

(Continued)

FOREIGN PATENT DOCUMENTS

| | | | | | |
|---|---|---|---|---|---|
| JP | 2005006048 A | * | 1/2005 | | H04N 5/14 |
| JP | 2009146190 A | * | 7/2009 | | |

OTHER PUBLICATIONS

Arah, Tom, Designer-Info.com, Expert Reviews & Articles/Tutorials on Publishing, Vector Drawing, Bitmap Editing, Web Design & 3D software, "Macromedia xRes 2," [Online], [retrieved Jul. 20, 2006] (12 pages).

(Continued)

*Primary Examiner* — Thomas D Lee
*Assistant Examiner* — Pawandeep Dhingra
(74) *Attorney, Agent, or Firm* — Wolfe-SBMC

(57) ABSTRACT

The present disclosure includes systems and techniques relating to processing of high resolution images, such as digital painting on high resolution images. In general, one aspect of the subject matter described in this specification can be embodied in a method that includes receiving input defining a modification to a target image; determining, at a first processor, a low resolution proxy result of the modification applied to the target image; determining, at a second processor, a higher resolution result of the modification applied to the target image; displaying the low resolution proxy result before completion of the determining at the second processor; and updating the displayed low resolution proxy result with the higher resolution result. Other embodiments of this aspect include corresponding systems, apparatus, and computer program products.

20 Claims, 10 Drawing Sheets

(56) References Cited

U.S. PATENT DOCUMENTS

| | | | |
|---|---|---|---|
| 7,034,791 B1* | 4/2006 | Odom | 345/98 |
| 7,551,203 B2* | 6/2009 | Nakayama et al. | 348/222.1 |
| 7,623,152 B1* | 11/2009 | Kaplinsky | 348/208.16 |
| 7,711,405 B2* | 5/2010 | Khamene et al. | 600/407 |
| 2003/0151671 A1* | 8/2003 | Kubota et al. | 348/207.99 |
| 2004/0246507 A1* | 12/2004 | Hattori | 358/1.2 |
| 2005/0078192 A1* | 4/2005 | Sakurai et al. | 348/207.99 |
| 2005/0100234 A1* | 5/2005 | Ferriere | 382/240 |
| 2005/0125368 A1* | 6/2005 | Akahori | 706/12 |
| 2005/0162671 A1* | 7/2005 | Illmann | 358/1.2 |
| 2005/0245810 A1* | 11/2005 | Khamene et al. | 600/410 |
| 2006/0011724 A1* | 1/2006 | Joseph et al. | 235/454 |
| 2006/0059426 A1* | 3/2006 | Ogikubo | 715/723 |
| 2006/0115176 A1* | 6/2006 | Kanamori et al. | 382/266 |
| 2006/0133690 A1* | 6/2006 | Bloomberg et al. | 382/269 |
| 2007/0041663 A1* | 2/2007 | Cho et al. | 382/299 |
| 2007/0091277 A1* | 4/2007 | Damera-Venkata et al. | 353/69 |
| 2008/0196076 A1* | 8/2008 | Shatz et al. | 725/116 |
| 2009/0080806 A1* | 3/2009 | Tanaka et al. | 382/299 |
| 2009/0160969 A1* | 6/2009 | Kuroiwa | 348/223.1 |
| 2009/0285547 A2* | 11/2009 | Ichihashi et al. | 386/83 |

OTHER PUBLICATIONS

Battelle, John. Wired Magazine, "The Next Big Thing. Live Picture," Issue 1.04, Sep./Oct. 1993. [Online], [retrieved Jul. 20, 2006] Retrieved from the Internet: <URL:http://www.wired.com/wired/archive/1.04/eword.html?pg=7> (4 pages).

Fernandez, I.G., Catedratica del Area de Arquitectura y Tecnologia de Computadores Universidad de Almeria, "Multiprocessor systems: Applications to image and video processing and optimization," SMAPIVO TIC2002-00228. Jornada de Seguimiento de Proyectos, 2004 (8 pages).

Planck, Rodi, et al., "Live Picture 2.0 v. PhotoShop 3.0", [Online], [retrieved Jul. 20, 2006] Retrieved from the Internet: <URL:http://philip.greenspun.com/wtr.live-picture-v-photoshop.html> (4 pages)).

Marshall, Trevor, Byte.com, "HSC's Live Picture features state-of-the-art technologies for enabling high-end image editing on the Power Mac," Jan. 1995 [Online], [retrieved Jul. 20, 2006] Retrieved from the Internet: <URL:http://www.byte.com/art/9501/sec12/art2.htm> (10 pages).

Seybold Publications, "Conclusion," Seybold Report on Desktop Publishing, vol. 9, No. 1. [Online], [retrieved Jul. 20, 2006] Retrieved from the Internet: <URL:http://www.seyboldreports.com/SRDP/0dp9/D0901004.HTM> (5 pages).

Seybold Publications, "FITS's Live Picture Image Editor: Well Worth the Wait," Seybold Report on Desktop Publishing, vol. 9, No. 1. [Online], [retrieved Jul. 20, 2006] Retrieved from the Internet: <URL:http://www.seyboldreports.com/SRDP/0dp9/D0901000.HTM> (2 pages).

Macromedia, Inc., "xRes 3.0 Overview", Xres TechNote [Online], [retrieved Jul. 20, 2006], 1997 (3 pages).

* cited by examiner

PROGRESSIVE REFINEMENT OF AN EDITED IMAGE USING SECONDARY HIGH RESOLUTION IMAGE PROCESSING

BACKGROUND

The present disclosure relates to image editing, such as digital painting on high resolution images. Generally, two common approaches exist for editing high resolution images. The first approach for applications that enable editing in real-time on high resolution images have used a proxy system where the user performs an editing operation such as painting on a low resolution version of the target image. The editing attributes and path were recorded into a log, and when the user requested a higher resolution version either by printing, exporting, or zooming in to a more detailed resolution, the application would then perform the deferred processing at the high resolution by replaying the log in connection with the increased output resolution.

Other applications take the second approach by processing image editing at the full image resolution and updating the screen display as this processing completes. Such applications can queue up the work at high resolution by maintaining a log that reflects the user's motions and input device attributes from an input device such as a tablet. The program does its best to be interactive by using multiple processors, if available, to render the editing operation at the full resolution.

SUMMARY

This specification describes technologies relating to processing of high resolution images, such as digital painting on high resolution images. In general, one aspect of the subject matter described in this specification can be embodied in a method that includes receiving input defining a modification to a target image; determining, at a first processor, a low resolution proxy result of the modification applied to the target image; determining, at a second processor, a higher resolution result of the modification applied to the target image; displaying the low resolution proxy result before completion of the determining at the second processor; and updating the displayed low resolution proxy result with the higher resolution result. Other embodiments of this aspect include corresponding systems, apparatus, and computer program products.

These and other embodiments can optionally include one or more of the following features. The method can include maintaining in local memory a compressed version of the target image for use in the determining at the first processor to provide real-time proxy editing independent of secondary storage for the target image. The determining at the first processor can involve determining the low resolution proxy result using a graphics processing unit, and the determining at the second processor can involve determining the higher resolution result using multiple processors. The updating can involve progressively refining the displayed low resolution proxy result by compositing the low resolution proxy result with intermediate results from the determining the higher resolution result, the intermediate results including reduced resolution portions of the higher resolution result. Moreover, the receiving can involve receiving input defining multiple modifications to the target image; the determining at the first processor can involve generating multiple foreground images in a proxy display list, each foreground image corresponding to a respective one of the multiple modifications, and the displaying can involve compositing the foreground images in the proxy display list with the target image.

Another aspect of the subject matter described in this specification can be embodied in a system including a user interface device; and one or more computers operable to cause a first processor to calculate a low resolution proxy result of a user modification applied to a target image, to cause a second processor to determine a higher resolution result of the user modification applied to the target image, and to interact with the user interface device to display the low resolution proxy result while the second processor determines the higher resolution result, and update the displayed low resolution proxy result in stages with intermediate results from the higher resolution result. The one or more computers can include the first processor including a graphics processing unit, and the one or more computers can be operable to use the graphics processing unit to calculate the low resolution proxy result. Further, the one or more computers can include multiple processors, including the second processor, and the one or more computers can be operable to cause the multiple processors to cooperatively determine the higher resolution result.

The one or more computers can include a server operable to interact with the user interface device through a data communication network, and the user interface device can be operable to interact with the server as a client. The user interface device can include a personal computer, which can include the first processor, and the server can include the second processor. The one or more computers can include a personal computer, and the personal computer can include the user interface device. The personal computer can include local memory and secondary storage, and the personal computer can be operable to maintain a compressed version of the target image in the local memory for use by the first processor to provide real-time proxy editing independent of the secondary storage.

The one or more computers can be operable to interact with the user interface device to update the displayed low resolution proxy result by compositing the low resolution proxy result with the intermediate results from the higher resolution result, the intermediate results including reduced resolution portions of the higher resolution result. The modification can include multiple modifications to the target image, the one or more computers can be operable to cause the first processor to generate multiple foreground images in a proxy display list, each foreground image corresponding to a respective one of the multiple modifications, and the one or more computers can be operable to interact with the user interface device to display the low resolution proxy result by compositing the foreground images in the proxy display list with the target image.

Particular embodiments of the subject matter described in this specification can be implemented to realize one or more of the following advantages. An improved proxy preview image editing system can be realized, including active background processing at the higher image resolution and more accurate proxy image display with temporal refinement of details. Improved user interactivity with a digital image editing application can be realized. Multiple processors and computer readable medium resources (e.g., memory and secondary storage) can be used efficiently, including by leveraging the one or more Graphics Processing Units (GPUs) often included in computing apparatus. The work of image processing can be distributed amongst multiple processors based on at least two resolution levels, such that the processors need not be starved for work or contend for the same bank of memory, and the user can be more rapidly provided a higher quality visual representation of a digital image being modified. The use of proxies can allow the user to perform a series of editing operations at a quicker pace than the high resolution image editing approach alone. The use of proxies can overcome performance shortcomings of traditional high resolution editing. The use of proxies can reduce the amount of memory required as portions of an image can be loaded into memory for editing. The use of high resolution refinement can improve the visual quality of a traditional proxy system. The use of high resolution refinement can also improve the efficiency of changing viewing zoom levels of a traditional proxy system.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
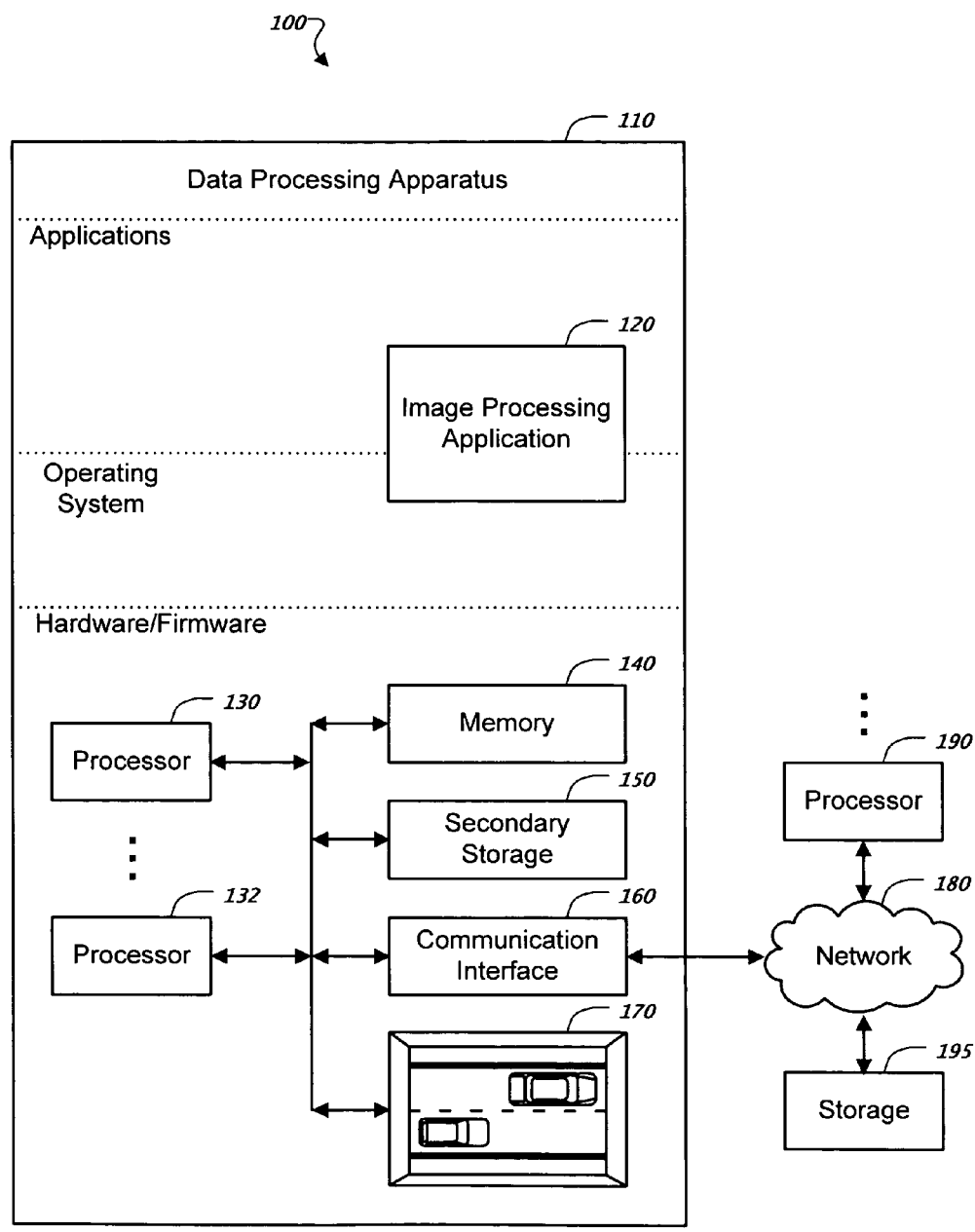
FIG. 1 shows an example system configured to process and display high resolution digital images.

FIG. 1 shows an example system 100 configured to process and display high resolution digital images. A data processing apparatus 110 can include a user interface device such as a keyboard, mouse, stylus, or any combination thereof, which communicates with an image processing application 120.

The data processing apparatus 110 also includes at least two processors. The processors can communicate with memory 140, secondary storage 150, a communication interface 160, and a user display device 170. The communication interface 160 can communicate over a network 180, which can be connected to other processor(s) 190 or storage device(s) 195. In some implementations, the apparatus 110 itself constitutes the user interface device and one or more portions of the application 120 can run on other processor(s) 190 or utilize other storage device(s) 195; in such implementations, the data processing apparatus 110 need not include multiple processors, as a remote processor 190 can handle some of the processing described herein.

The image processing application 120 makes use of at least two processors to calculate a lower resolution version of a target image and a higher resolution version of the target image. A first processor 130 calculates a lower resolution proxy result of a user modification to the target image. While, in parallel, a second processor 132 can determine a higher resolution result of the user modification applied to the target image.

The processors can exist as central processing units (CPUs) or as graphical processing units (GPUs). The processors can use memory 140 (e.g., RAM) and secondary storage 150 (e.g., a hard drive) to store results. Communication with the GPUs can be handled by a custom driver that runs on a CPU and is exposed via system level API (Application Program Interface), such as OpenGL® developed by Silicon Graphics (Mountain View, Calif.), DirectX® developed by Microsoft (Redmond, Wash.), or CoreImage® developed by Apple Computer (Cupertino, Calif.). One or more processors can be used in calculating the lower resolution proxy result, and one or more additional processors can be used in calculating the higher resolution version, including other processor(s) 190 that are accessible through the network 180.

The image processing application 120 can interact with the device 170 to display the low resolution proxy result while the second processor determines the higher resolution result and updates the displayed low resolution proxy result in stages with intermediate results from calculated portions of the higher resolution result. In some implementations, more than one display device 170 is used to convey updated information to the user. The user can configure what is displayed on the display devices 170 for efficient information presentation. For example, two display devices 170 could be configured so that one display device 170 shows the lower resolution proxy result, and one display device 170 shows the higher resolution version. Each display can be updated independently to show modifications to their respective results as they are calculated by the processors.

Figure 2:
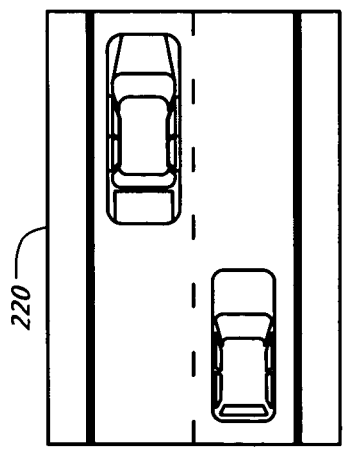
FIG. 2 shows lower resolution and higher resolution versions of an example target image.
Figure 2:
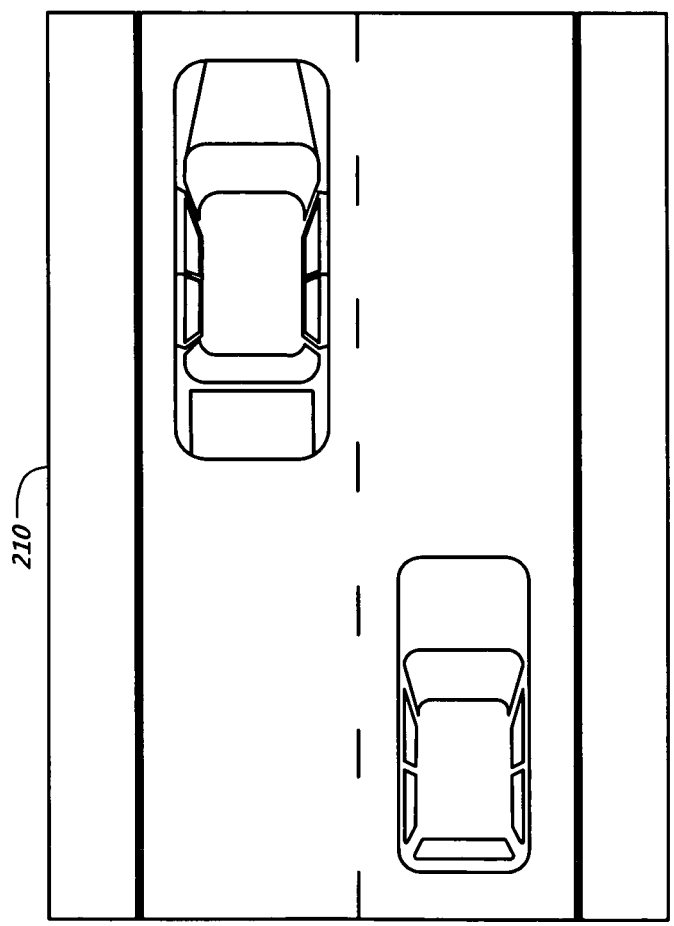

FIG. 2 shows lower resolution and higher resolution versions of an example target image. A user, using a user interface device, can define a modification to a target image using a variety of methods (e.g., color correaction, scaling, rotation, translation, and filtering, including potentially using a brush tool to define the modification with respect to the target image). The lower resolution version 220 can be continuously updated by the first processor as portions of the higher resolution version values are calculated by at least one additional second processor. In some implementations, each image can be stored singly or the images can be stored in an image pyramid. If the images are stored in a pyramid structure, each editing operation can create a new state object that can include a new image version and a log of parameters required to reconstruct the processing on a higher resolution level of the pyramid.

As portions of the higher resolution version 210 are calculated, they are reduced in size and combined with the corresponding area of the lower resolution version 220. In some implementations, the higher resolution version 210 can be broken up into tiles for efficient processing and compositing.

A flag can be kept per tile that marks it as having been written to a backing store such as the secondary storage 150 or the remote storage 195. All tiles which have not been written to the backing store can be written both during idle time, for example when there are no painting operations left to be processed, or as needed on demand to free up system 100 resources. When such a tile is accessed and its content is not in memory 140, the content can be retrieved from the local secondary storage 150 or the remote storage 195. Tiles can also be referenced counted to allow their system 100 resources to be freed up when they are no longer referenced. Tiling is discussed in more detail in reference to FIG. 4.

Figure 3:
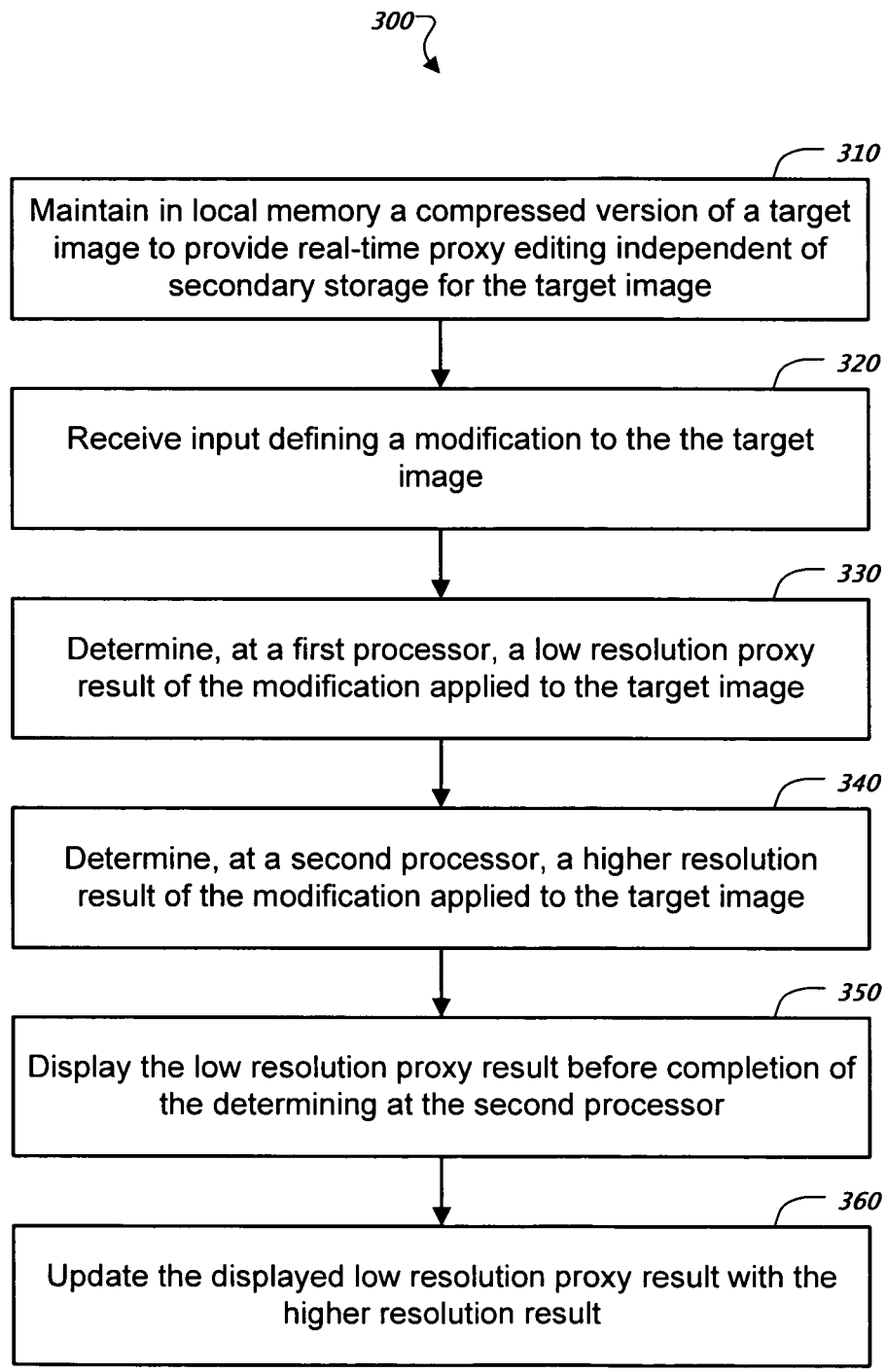
FIG. 3 is a flow chart showing an example method of processing and displaying high resolution digital images.

FIG. 3 is a flow chart showing an example method 300 of processing and displaying high resolution digital images. A compressed version of a target image can be maintained 310 in local memory to provide real-time proxy editing independent of the secondary storage 150 or remote storage 195 for the target image.

The image compression can be lossy or lossless and can be specified by the user. Lossless compression can be used for artificial images such as technical drawings or medical images and can be implemented through various well-known methods (e.g., run-length encoding, entropy encoding, etc.). Lossy compression can be used for natural images such as photos, where loss of image fidelity is acceptable in order to achieve a substantially compressed image, where the loss of image fidelity is relative to the compression level desired. There are many well-known methods of lossy compression including chroma subsampling, transform encoding (e.g., wavelet transforms), and fractal compression.

The user can generate input using a user interface device, and the generated input defining a modification to the target image (e.g., a brush application operation) can be received 320 in a conventional manner. The received inputs can be queued in one or more queues for processing by the processors. In some implementations, the received inputs can be copied as they are received by the processors or they can be removed from the queue in a conventional manner as they are processed.

Using a first processor, a lower resolution proxy result is determined 330 by applying the modification to the target image. As the first processor calculates the lower resolution proxy result, the lower resolution proxy result can be retained in a list of lower resolution proxy results. A bounding rectangle can also be retained with the lower resolution proxy result that encompasses the area covered by the received input.

In some implementations, an entry in the list of lower resolution proxy results can include a bounding rectangle for that operation and a foreground image that represents the changed pixels with a transparency mask to control blending at each pixel, if needed. Optionally, the image processing application 120 can save a foreground image or a foreground region of interest (e.g., a selection mask, a rectangle, or some other geometry) and the parameters required to recreate the foreground pixels (e.g., the parameters for a filter, or the settings for a brush). The list of lower resolution proxy results and the bounding rectangles can be used by the method 300 when the lower resolution proxy result is updated with the higher resolution result. This approach can be useful in cases where the results can be computed very fast, but primary storage is a limiting factor.

The method 300, in parallel, using at least one second processor, determines 340 a higher resolution result of the modification applied to the target image. As portions of the higher resolution version values are calculated, the calculated portions can be composited with the lower resolution proxy result. The portions of the higher resolution version can be organized into tiles, as discussed further below in connection with FIG. 4.

While processing continues on the higher resolution result, the method displays 350 the lower resolution proxy result. The lower resolution proxy result can be determined from one or more modifications and can be composited from the lower resolution proxy result list. The number of modifications exhibited by a lower resolution proxy result can depend on the number of received inputs (e.g., the number of brush application operations) queued with the bounding rectangle(s) of the lower resolution proxy result.

The method 300 can update 360 the displayed lower resolution proxy result with the higher resolution result (e.g., tiled updates). When the higher resolution result is available from prior commands, a compositing operation can be used to merge the low resolution painting result with the reduced high resolution data from previous commands. If a series of painting operations have been performed, a composite of the series of low resolution modifications can be concatenated into a single screen sized proxy result in some implementations (depending on the blending mode being used). The updated display results can update the display device 170 so the user can receive continuously updated results of the painting operation(s).

Figure 4:
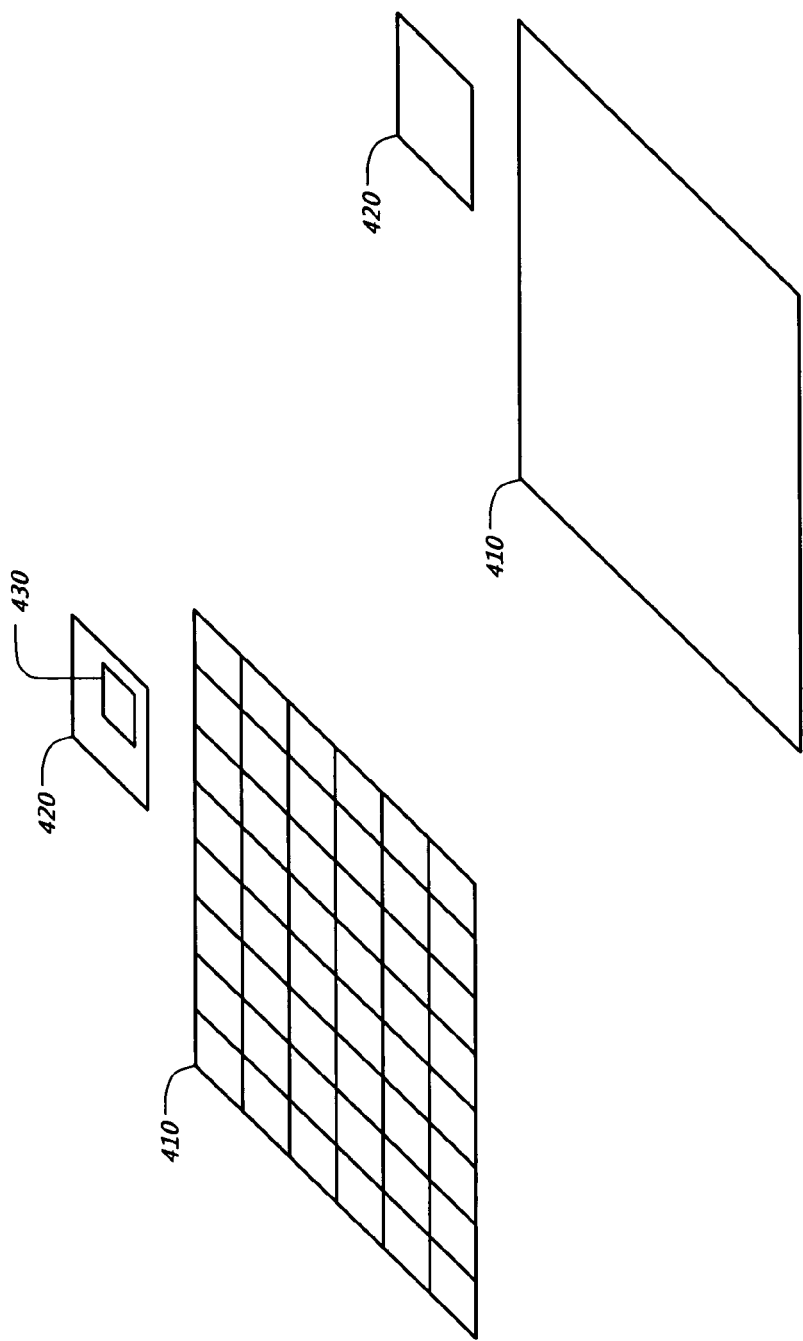
FIG. 4 shows an example technique for updating a lower resolution proxy result with a higher resolution result of a target image.

FIG. 4 shows an example technique for updating a lower resolution proxy result with a higher resolution result of a target image. The tiling technique shown can separate the higher resolution version 410 into tiles for processing. The tiles can be of uniform dimensions, or they may be of differing dimensions, and may at least partially overlap each other.

One or more second processors receive the modification request generated by the image processing application 110 as a paint operation specified by the user input, and begin to calculate a change to the higher resolution version 410. As each tile in the higher resolution version 410 is computed by the second processor(s), the updated tile is reduced in size so that it can be used to update a lower resolution version 420.

If the tile is in a region 430 of the lower resolution version 420 that does not intersect a bounding rectangle for a previous modification, the image processing application 10 can copy the tile into place within the region 430. Otherwise, the foreground mattes in the proxy display list can be composited onto the tile before displaying the tile in the region 430 on the screen.

If a pyramid representation of the images is used, the reduced levels of the pyramid can be constructed by filtering and subsampling a higher resolution level of the pyramid. In some implementations, the filter is an averaging box filter.

Flags can be maintained at each tile of the lower resolution levels of the image pyramid that mark them as needing to be recalculated. There can be more than one flag per tile, one to represent a fraction of a target tile, and others to represent source tiles from other resolution levels.

When the lower resolution levels of the pyramid are accessed for display at a reduced zoom level; decimation can take place. Decimation, e.g., sampling after pre-filtering, from the lower resolution level takes place if the flags indicate that decimation is required. For example, if an area of the target image does not have queued painting operations, a transition between resolution levels can be done without decimating the higher resolution tiles.

In some implementations, a lossy compressed representation of a tile in memory 140 can be maintained. Alternatively, a lossless representation of a tile can be maintained in memory 140. The representation of a tile, either lossy or lossless, can include additional information regarding how to reconstruct the tile at a higher resolution, such as a form of pyramid encoding for lossy representations. In general, the images can be represented in many different forms, as is readily understood by those of ordinary skill in the art.

Additional flags can be added to indicate that the tile is a proxy representation. For example, the flags can indicate that the level was constructed from a lossy compression or that scaled editing operations have been applied directly to the tile for image preview purposes.

In some implementations, access to the tiles can be controlled by separate threads that can use reader and writer locks. Reader and writer locks (e.g. semaphores) can be used by the processor(s) to avoid conventional pitfalls in multi-processor and multi-threading computing, such as deadlocks and race conditions.

Figure 5:
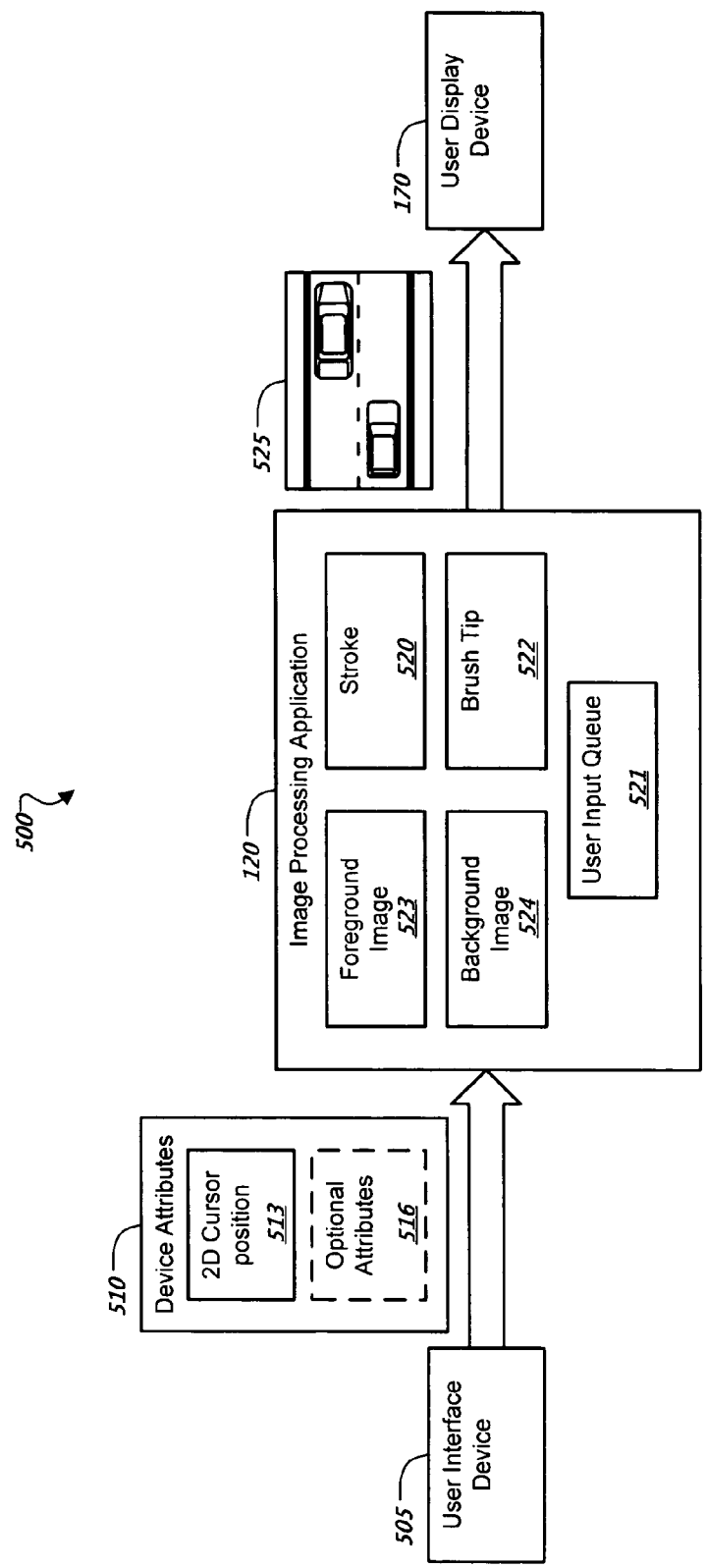
FIG. 5 shows an example workflow of an image processing application, as can be used in the example system of FIG. 1.

FIG. 5 shows an example workflow 500 of an image processing application 120, as can be used in the system of FIG. 1. The image processing application 120 can receive device attributes 510 from a user interface device 505. The device attributes can include a 2-D cursor position 513 and optional attributes 516 (e.g., a timestamp, stylus pressure, finger/thumb wheel position, stylus tilt angle, stylus orientation angle, stylus barrel rotation angle, pen z position, etc.).

The image processing application 120 can use the device attributes to generate a stroke 520, which can be queued in a user input queue 521 for processing as a painting operation by the first processor 130, the second processor 132, the remote processor(s) 190, or some combination thereof. A brush tip 522 can be applied along the stroke 520 to modify a foreground image 523 which is composited with a background image 524 to form an updated composite image 525. The composite image 525 is sent to a user display device 170 for viewing.

A stroke 520 is a collection of device attributes that are continuously collected as a user operates a user input device (e.g., a mouse, tablet stylus, keyboard, etc.). In some implementations, the end of the stroke 520 is indicated by the user releasing the mouse button, removing the stylus from the writing surface, or releasing a key from the keyboard.

The stroke 520 can define the paint operation that the image processing application calculates by applying a brush tip 522 along a path specified using a set of parameters defined by the user, such as spacing and distribution attributes. The stroke 520 can be stored in an array or other data structures, such as a linked list or a vector.

A brush tip 522 is a digital construct used to apply painting operations to a target image. In some implementations, the brush tip 522 is a single 2-D rectangular array of grayscale pixels. Brush tips 522 can be predetermined and selected by the user or be algorithmically determined based on a high-level geometric or physical model. The pixels of the brush tip 522 are stored in different ranges depending on the size of the data elements. For example, a range of [0 . . . 65535] can be used for 16-bit data elements or [0 . . . 255] can be used for byte sized data elements.

The brush tip 522 can include transparency values, and in some implementations, the values of the brush tip 522 represent a soft round Gaussian shape that has denser values near the center and taper off to zero near the edges. The tip 522 can be stored in a pyramid structure, such as a mipmap, to allow rendering at differing resolutions in response to user input.

The foreground image 523 can be a 2-D array of pixel values that include an alpha or mask component and image components. The image components can define a color space and are often represented as color components of an image. For example, the RBG color space would have red, green and blue color components, while the CMYK (cyan, magenta, yellow, and black) color space would have cyan, magenta, and black color components. In some implementations, the image components do not directly correspond to image colors, such as shading attributes. The attributes can include parameters that are used to calculate surface properties of the foreground image 523. The foreground image 523 can be stored in various resolutions (e.g., 16-bit or 32-bit, etc.).

The mask components can initially be set to zero. The values of the image, mask or alpha components in the foreground image 523 can be modified during a painting operation. In some implementations, the color components are set to an unchanging value at the start of the painting operation (e.g., a solid constant color, a tessellated pattern, or an offset of the background image (i.e., image cloning), etc.). As painting operations are processed, brush tips 522 are accumulated in the foreground image's mask channel.

When brushing at the lower resolution proxy level, the lower resolution foreground result can be cached, so that it can be composited with the scaled down version of the higher resolution result as the second processor finishes calculating the higher resolution result and updates the screen. A paint method can be used to apply the brush tips along the stroke to the foreground image 523. For example, when applying a solid color (e.g., green) the foreground image 523 can have its color components filled with a constant value, such as the value for the color green, and the mask component set to zero. In some implementations, as each tip is laid down, the mask component is combined with the values of the tip. For example, for each pixel with a foreground matte value of less than one, a new foreground matte value can be set equal to the current foreground matte value plus the tip value times the quantity of one minus the current foreground matte value. More complex interactions can be attained by allowing the color components as well as an additional mask component to be altered each time the tip is combined with the foreground image. For example, in Photoshop®, available from Adobe Systems Incorporated (San Jose, Calif.), the painting method can result in creating a foreground image that is composited over the original target image's pixel data.

The background image 524 can be constructed and persisted in the same fashion as the foreground image 523. In some implementations, the background image 524 can have non-modifiable components such as the mask or alpha component or the color components. The background image's color components can be preweighted with the mask or alpha, or they may not be preweighted. The background image 524 can represent a set or subset of the current modifications to the target image, or be left unmodified to represent the target image. In some implementations, upon completion of a painting command, the background image 524 can be replaced with the resulting composite image 525. For example, in Photoshop®, the background image can be the current target layer before the modifications are applied. Background images can also be generated procedurally, such as those driven by shaders, fractal algorithms, and many pattern generating algorithms. The image can also be a tessellated copy of a subimage.

The composite image 525 is the result of combining the foreground image 523 over the background image 524 using a blend mode and an optional global transparency value. During painting operations, temporary feedback is given to the user of a given rectangular region by combining the foreground 523 and background 524 images.

In some implementations, the composite image 525 can represent more than one modification to the target image. For example, if more than one modification exists in a bounding rectangle of the lower resolution version, it can be preferable to combine the modifications into a single composite image 525 instead of creating a composite image for each of the separate modifications. The image processing application 120 can use the lower resolution proxy result list to combine multiple modifications in a bounding rectangle into a single composite image 525.

A blend function is used to combine the foreground 523 and background images 524 by receiving two pixel values, one pixel from the foreground image 523 and one pixel from the background image 524. The pixel values can include a pixel transparency represented by a value in the range of [0 . . . 1] (or wider ranges, as may be desired to achieve certain effects). The combination of the two transparency values produces a resulting pixel value that can be used in the resulting composite image 525.

A user input queue 521 is used to store incoming user inputs. The queue can be constructed as a first-in-first-out queue (FIFO) or other conventional queue. The user input queue 521 accumulates paint operations that are processed by the first processor 130 and second processor 132 when calculating the lower resolution proxy result and the higher resolution result, respectively.

In some implementations, a copy of the paint operation is sent to the first processor 130 as it calculates the lower resolution proxy result. In other implementations, two queues are instantiated; one for the first processor 130 and one for the second processor 132 and user inputs are consumed in each as their respective processors calculate lower and higher resolution results.

Figure 6:
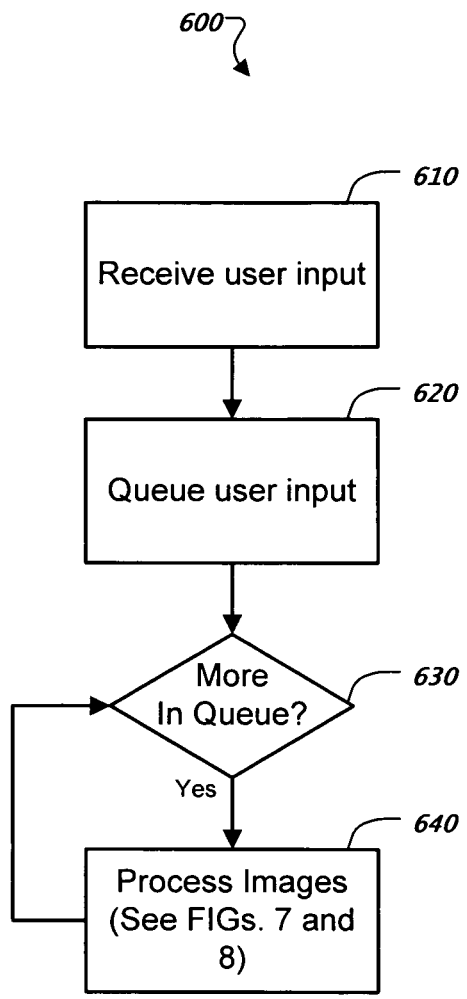
FIG. 6 is a flow chart showing an example of general processing of one or more user input queues.

FIG. 6 is a flow chart showing the general processing 600 of one or more user input queues 521. As the user interacts with the input device (e.g., mouse, stylus, keyboard, etc.) user input is received 610 by the image processing application 120.

The input(s) are queued 620 in a conventional queue, such as a FIFO queue. In some implementations, more than one queue is created. A first queue is used by the first processor 130 and a second queue is used by the second processor 132 or the remote processor(s) 190. Both queues contain copies of the originating user input, but each queue is processed at a rate consistent with the calculation of the lower resolution proxy result and the higher resolution result by their respective processors.

If there are more painting operations in the queue(s) 630, the painting operations are processed 640 by their respective processors. As each processor finishes calculating its results, the results are composited and the display updated. If the queues are empty, the processors can continue to calculate the higher resolution and lower resolution results (based on the last received user input) while the image processing application 120 waits on more user input.

In some implementations, updating the display is deferred until a predetermined elapsed time or area threshold has been exceeded. If an update is deferred, the lower resolution proxy display list can be used to composite the deferred updates into a single low resolution proxy result.

As tiles from the higher resolution result are computed, they are used to update the lower resolution proxy result. The lower resolution proxy result can be updated in a variety of ways. For example, if the proxy result is stored as the original background image (i.e., the target image) combined with all the foreground images that represent changes to the background image, the new lower resolution proxy result can be created by occluding the prior lower resolution results for a given tile.

Figure 9A:
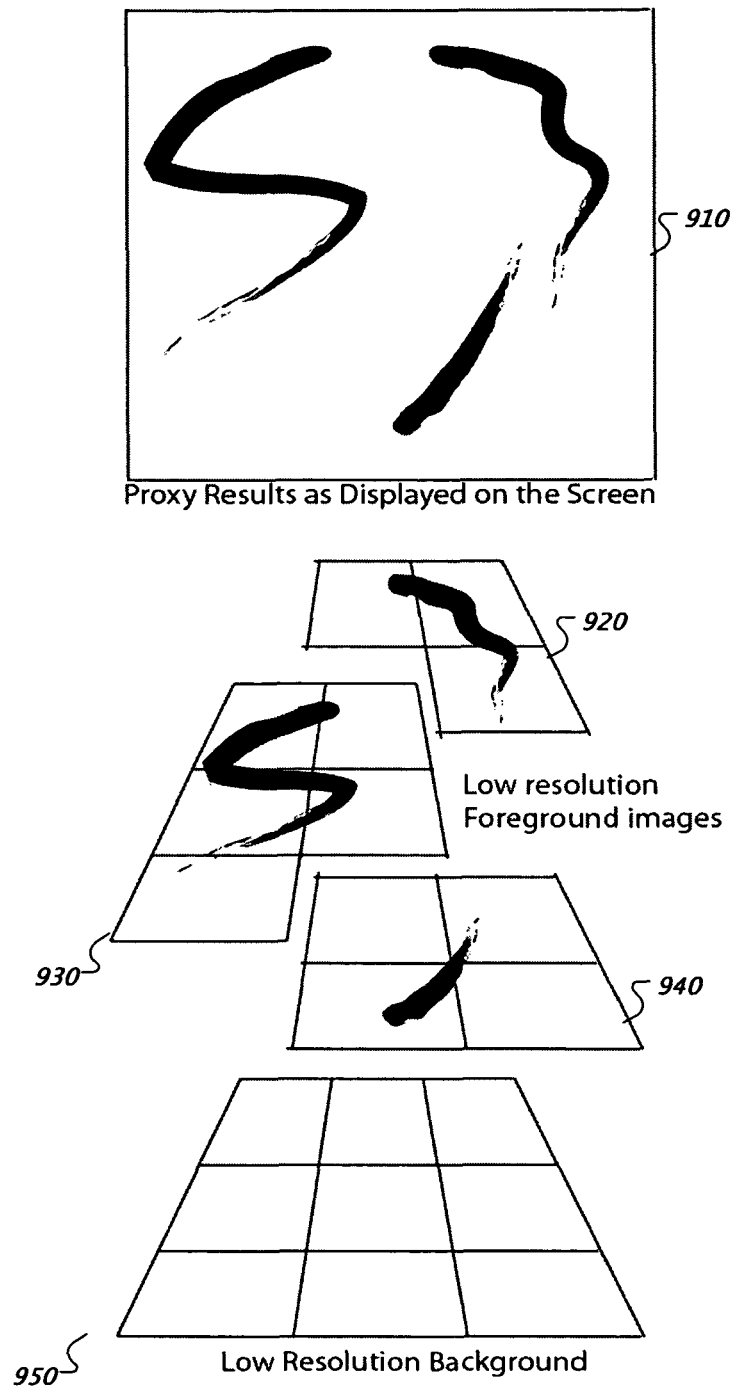
FIGS. 9A and 9B are schematic diagrams showing an example tiling structure.
Figure 9B:
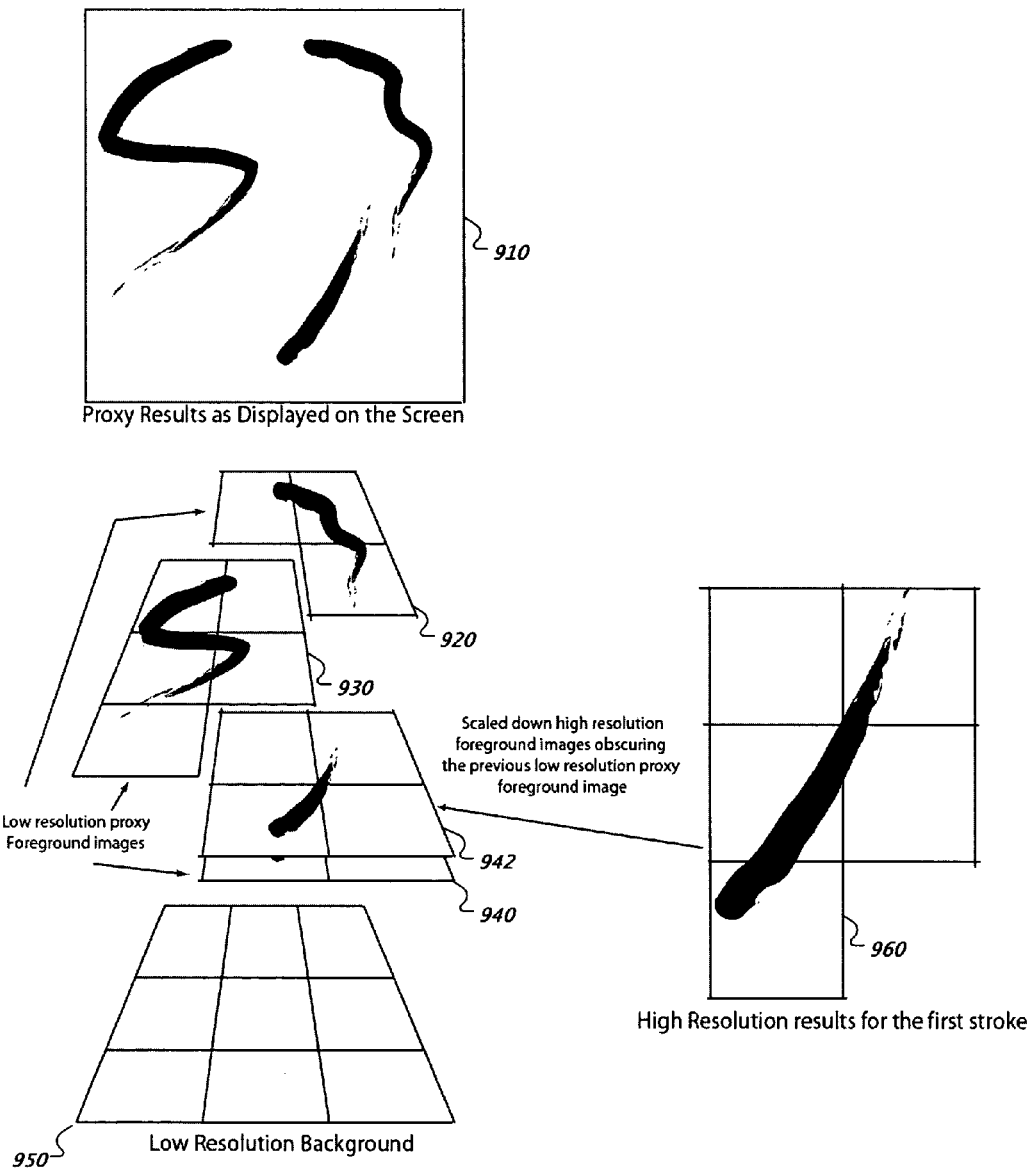

To occlude the prior lower resolution results, a reduced version of a higher resolution tile can be inserted behind the foreground images in the proxy display list that represents the changes yet to be computed by one or more local or remote processors on the higher resolution result (e.g., as shown in FIG. 9B). In some implementations, multiple foreground images can be combined with the prior reduced results as the higher resolution processing is completed.

FIGS. 9A and 9B are schematic diagrams showing an example tiling structure. A proxy result 910 is displayed on a display device 170. The proxy result 910, as shown in the example, is an accumulation of painting operations, but can represent other types of editing operations (e.g., noise removal, scaling operations, or changes in color depth).

Lower resolution proxy foreground images 920, 930, and 940 each represent separate previously computed painting operations as a set of tiles overlaying a lower resolution background image 950. As shown, the lower resolution foreground images partially overlap. The lower resolution foreground images are combined with the lower resolution background image 950 (e.g., using traditional compositing techniques) to create the proxy result 910 that is displayed.

As described previously, the image processing application 120 calculates editing operations applied to a target image. As higher resolution results of the editing operations are computed, the results are reduced in size and combined with the lower resolution tiles which can update a proxy result. For example, a higher resolution result 960 of a painting operation is reduced in size to create a lower resolution foreground image 942. The lower resolution foreground image 942 obscures the previous lower resolution proxy foreground image 940 for that operation.

Because the previous lower resolution proxy is obscured, changes to the lower resolution result are defined by the computed higher resolution result. For example, any changes in the pixel values in the higher resolution result supersede the pixel values at similar locations of the previous lower resolution proxy foreground image. Obscuring the lower resolution proxy results can be accomplished using one or more layers. Layers can optionally be combined to reduce the number of layers that are processed when a proxy result is displayed.

Figure 7:
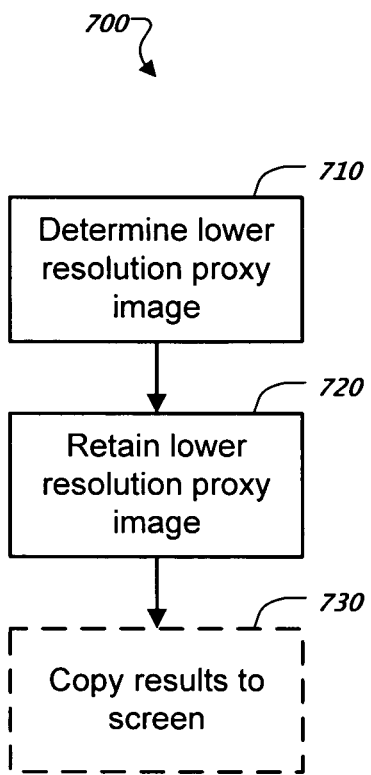
FIG. 7 is a flow chart showing an example of general processing of a paint operation on a lower resolution proxy version of the target image.

FIG. 7 is a flow chart showing the general processing 700 of a paint operation on the lower resolution proxy version of the target image. The user input, as defined by the next item in the user input queue 521, specifies a path that can be scan converted at the current zoom level resolution. Digital mark making methods can be used to render or composite a scaled brush tip. The brush tip is composited along the line segment specified by the user input and the interaction of the brush tip is calculated to determine 710 a lower resolution proxy image. The lower resolution proxy result calculation can be done by one or more local processors 130 and 132, or remote processor(s) 190. In some implementations, the lower resolution proxy result or the lower resolution proxy result list can be maintained in memory 140 or in the GPU's memory, such as texture memory.

Each resulting lower resolution proxy composite image can be retained 720 in a proxy display list along with its foreground matte. The proxy display list can be compQsited with the foreground image to form a composite of prior processed painting operations. In some implementations, the processed modification can include an "undo" step. In such cases, the previously calculated modification can be removed from the proxy display list and the proxy display list re-composited with the foreground image to produce a current result without recalculating the intermediate proxy results contained in the proxy result list.

When a predefined time threshold or image area threshold is exceeded a new composite image can be calculated from the lower resolution foreground image and the lower resolution background image and can be optionally copied 730 to the lower resolution result being displayed by the display device 170. In some implementations, the composite image can replace the background image, becoming the new background image for future compositing operations.

Figure 8:
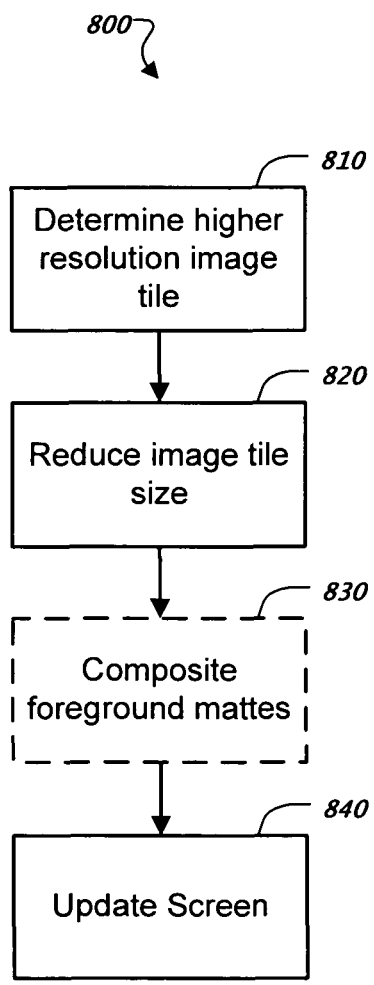
FIG. 8 is a flow chart showing an example of general processing of a paint operation on a higher resolution version of the target image.

FIG. 8 is a flow chart showing the general processing 800 of a paint operation on the higher resolution version of the target image. User inputs can be scan converted at the higher resolution and the target image can be modified by using a high resolution brush tip 522.

The user input can be accessed through the user input queue 521 which specifies a painting operation within a given region of the higher resolution version of the target image. The region can correspond to a tile or set of tiles of the higher resolution version of the target image. In some implementations, the higher resolution image can be subdivided by a set of queues. For example, a higher resolution image could have four queues, one for each quadrant of the target image. In such an implementation one processor can be assigned to each queue, or in the example, the higher resolution image can be processed by four different processors each with their own user input queue 521 specifying a different region of the target image.

The brush tip can be applied to the computed tile(s), and the processor(s) determine 810 a higher resolution image tile. In situations where the computed region is larger than one tile, the processing can be done per tile, or in some implementations, the size of the tile can be recomputed to encompass the modified region and the processing can be done on the newly computed tile. The processor(s) can be one or more local processor(s) 130 and 132 or can be remote processor(s) 190, or some combination thereof.

As work on a tile at the higher resolution is finished, the tile is reduced in size 820 to update the screen. If the queued painting operations in the bounding regions of the lower resolution proxy result intersect the higher resolution tile, the higher resolution tile can be optionally composited 830 with the foreground mattes in the lower resolution proxy results list before it is copied to the lower resolution image to update the screen 840. If the second processor(s) are not processing user input from the user input queue(s) 521 they can continue to refine higher resolution results and combine them with the lower resolution proxy results as the higher resolution image tile calculations are completed.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. In some embodiments, the image processing application can reside on a handheld device (e.g., a mobile phone, digital camera, or other portable personal computing device). In some embodiments, the image processing application can communicate through a network to a remote server that performs the higher resolution computations. For example, a handheld device can update the displayed lower resolution version with the remotely computed higher resolution result.

What is claimed is:

1. A method comprising: receiving input defining a modification to a target image, the modification to the target image including an image editing operation; determining, at a first computer processor executing an image processing application, a low resolution proxy result of the modification applied to the target image; determining, at a second computer processor executing the image processing application and in parallel with the determining at the first computer processor, a higher resolution result of the modification applied to the target image; displaying the low resolution proxy result before completion of the determining at the second processor; reducing high resolution data from a previous input defining another modification to the target image; generating a low resolution modification result based, at least in part, on the reduced high resolution data from the previous input; incrementally compositing the low resolution proxy result of the modification applied to the target image with a series of low resolution modification results generated from the previous input defining another modification to generate an image proxy result, the image proxy result representing a tile update to a tile of the low resolution proxy result; and updating the displayed low resolution proxy result with the image proxy result and subsequently with the higher resolution result for the modification to the target image.

2. The method of claim 1, wherein the determining at the first computer processor comprises determining the low resolution proxy result using a graphics processing unit, and the determining at the second computer processor comprises determining the higher resolution result using multiple processors.

3. The method of claim 1, wherein the updating comprises progressively refining portions of the displayed low resolution proxy result by compositing the low resolution proxy result with the series of low resolution modification results.

4. The method of claim 3, wherein:
the receiving comprises receiving additional inputs defining multiple modifications to the target image subsequent to said receiving the input;
the updating comprises separating the target image into individual tiles of different dimensions for said updating the displayed low resolution proxy result;
the determining at the first computer processor comprises generating multiple foreground images in a proxy list, each foreground image corresponding to a respective one of the multiple modifications; and
the displaying comprises compositing the foreground images in the proxy list with the target image.

5. The method of claim 1, further comprising maintaining in local memory a compressed version of the target image for use in the determining at the first computer processor to provide real-time proxy editing independent of secondary storage for the target image.

6. A non-transitory computer-readable medium storing a computer program operable to cause a data processing apparatus to perform operations comprising: receiving input defining a modification to a target image, the modification to the target image including an image editing operation; determining, at a first computer processor, a low resolution proxy result of the modification applied to the target image; determining, at a second computer processor and in parallel with the determining at the first computer processor, a higher resolution result of the modification applied to the target image; displaying the low resolution proxy result before completion of the determining at the second processor; reducing high resolution data from a previous input defining another modification to the target image; generating a low resolution modification result based, at least in part, on the reduced high resolution data from the previous input; incrementally compositing the low resolution proxy result of the modification applied to the target image with a series of low resolution modification results generated from the previous input defining another modification to generate an image proxy result, the image proxy result representing a tile update to a tile of the low resolution proxy result; and updating the displayed low resolution proxy result with the image proxy result and subsequently with the higher resolution result for the modification to the target image.

7. The non-transitory computer-readable medium of claim 6, wherein the determining at the first computer processor comprises determining the low resolution proxy result using a graphics processing unit, and the determining at the second computer processor comprises determining the higher resolution result using multiple processors.

8. The non-transitory computer-readable medium of claim 6, wherein the updating comprises progressively refining portions of the displayed low resolution proxy result by compositing the low resolution proxy result with the series of low resolution modification results.

9. The non-transitory computer-readable medium of claim 8, wherein: the receiving comprises receiving additional inputs defining multiple modifications to the target image subsequent to said receiving the input; the updating comprises separating the target image into individual tiles of different dimensions and at least partially overlapping each other for said updating the displayed low resolution proxy result; the determining at the first computer processor comprises generating multiple foreground images in a proxy list, each foreground image corresponding to a respective one of the multiple modifications; and the displaying comprises compositing the foreground images in the proxy list with the target image.

10. The non-transitory computer-readable medium of claim 6, further comprising maintaining in local memory a compressed version of the target image for use in the determining at the first computer processor to provide real-time proxy editing independent of secondary storage for the target image.

11. The method of claim 1, wherein the second computer processor is associated with a device remote from the first computer processor.

12. The method of claim 1, wherein the second computer processor is accessible via a network.

13. The non-transitory computer-readable medium of claim 6, wherein the first computer processor is coupled to a data processing apparatus and the second computer processor is coupled to device separate from the data processing apparatus.

14. A system comprising: one or more computers operable to cause operations including: receiving input defining a modification to a target image, the modification to the target image including an image editing operation; determining, at a first computer processor executing an image processing application, a low resolution proxy result of the modification applied to the target image; determining, at a second computer processor executing the image processing application and in parallel with the determining at the first computer processor, a higher resolution result of the modification applied to the target image; displaying the low resolution proxy result before completion of the determining at the second processor; reducing high resolution data from a previous input defining another modification to the target image; generating a low resolution modification result based, at least in part, on the reduced high resolution data from the previous input; incrementally compositing the low resolution proxy result of the modification applied to the target image with a series of low resolution modification results generated from the previous input defining another modification to generate an image proxy result, the image proxy result representing a tile update to a tile of the low resolution proxy result; and updating the displayed low resolution proxy result with the image proxy result and subsequently with the higher resolution result for the modification to the target image.

15. The system of claim 14, the first computer processor including a graphics processing unit.

16. The system of claim 14, the second computer processor and at least one additional processor cooperatively implementing the image processing application to determine the higher resolution result of the modification applied to the target image.

17. The system of claim 14, the one or more computers including a server device that determines the higher resolution result of the modification applied to the target image.

18. The system of claim 14, further comprising local memory and secondary storage, the local memory operable to maintain a compressed version of the target image for use by the first computer processor to provide real-time proxy editing independent of the secondary storage.

19. The system of claim 14, the operations further including displaying the low resolution proxy result composited with the series of low resolution modification results responsive to each incremental update.

20. The system of claim 14, the determining at the first computer processor including generating a foreground image in a proxy list, the foreground image corresponding to the modification applied to the target image.

* * * * *